(12) United States Patent
LaVigna et al.

(10) Patent No.: US 8,734,928 B1
(45) Date of Patent: May 27, 2014

(54) DECORATIVE COVER FOR OUTDOOR PATIO HEATERS

(76) Inventors: Melody LaVigna, Tarzana, CA (US); Barbara Miranda, Los Angeles, CA (US)

(*) Notice: Subject to any disclaimer, the term of this patent is extended or adjusted under 35 U.S.C. 154(b) by 53 days.

(21) Appl. No.: 13/348,362

(22) Filed: Jan. 11, 2012

Related U.S. Application Data

(60) Provisional application No. 61/433,270, filed on Jan. 17, 2011.

(51) Int. Cl.
| | |
|---|---|
| *B32B 3/06* | (2006.01) |
| *A41D 31/00* | (2006.01) |
| *B29L 31/00* | (2006.01) |
| *B65D 65/08* | (2006.01) |

(52) U.S. Cl.
CPC ........ *A41D 31/0022* (2013.01); *A41D 2300/24* (2013.01); *A41D 2300/32* (2013.01); *A41D 2400/20* (2013.01); *A41D 2400/22* (2013.01); *B29L 2031/729* (2013.01); *B65D 65/08* (2013.01); *Y10S 428/92* (2013.01); *Y10S 428/921* (2013.01)
USPC ........... 428/100; 428/181; 428/920; 428/921; 150/154

(58) Field of Classification Search
CPC ...... A41D 27/285; B65D 65/02; B65D 65/10; B65D 65/04; B65D 65/06; B65D 65/08
See application file for complete search history.

(56) References Cited

U.S. PATENT DOCUMENTS

| | | | | |
|---|---|---|---|---|
| 2,424,398 | A * | 7/1947 | Koret | 2/211 |
| 2,868,255 | A * | 1/1959 | Fancher | 206/423 |
| 4,449,034 | A * | 5/1984 | Taniguchi | 219/217 |
| 4,581,277 | A * | 4/1986 | Neale | 428/181 |
| 5,253,492 | A * | 10/1993 | Mitsumoto | 66/69 |
| 5,399,428 | A * | 3/1995 | Asrar | 428/364 |
| 5,694,866 | A * | 12/1997 | Muller | 108/161 |
| 6,029,279 | A * | 2/2000 | Ralston et al. | 2/211 |
| D489,125 | S * | 4/2004 | Drake | D23/386 |
| 8,038,211 | B2 * | 10/2011 | Berk et al. | 297/229 |
| 2002/0004114 | A1* | 1/2002 | Leaphart et al. | 428/36.1 |
| 2004/0231053 | A1* | 11/2004 | Masoncup | 5/493 |
| 2009/0107972 | A1* | 4/2009 | Naylor et al. | 219/162 |

OTHER PUBLICATIONS

Wayback Machine, "Merriam-Webster Online Dictionary—definition: Mesh". Nov. 13, 2013. <http://web.archive.org/web/20131113001041/http://www.merriam-webster.com/dictionary/mesh>.*

(Continued)

*Primary Examiner* — Aaron Austin
*Assistant Examiner* — Donald M Flores, Jr.
(74) *Attorney, Agent, or Firm* — Jon Fallon, Esq.; Michael Kochka, Esq.

(57) ABSTRACT

After observing patio heaters at many events, hotels and restaurants, we, as decorators, knew they have little decorative appeal in beautiful settings.

Patio heaters have gained popularity as people are enjoying more outdoor entertaining. We designed a cover to "hide" the heaters. Our cover is a tailored, box-pleat skirt design with three pleats, two side pleats are inset with fabric mesh to allow for ventilation of the tank, and detailed with a welt trim. Like a slip-cover, it fits over the neck and base of the heater, fastened with hook/loop sewn inside.

All components are fire retardant. They are machine washable, hold their shape, offer protection from the elements, and have easy setup, and access to controls.

1 Claim, 3 Drawing Sheets

(56) References Cited

OTHER PUBLICATIONS

Johnson, Liz; "Michael Miller Fabrics' Citron-Gray Nursery: Pleated Crib Skirt". Aug. 8, 2011. <ttp://www.sew4home.com/projects/bed-linens/michael-miller-fabrics-citron-gray-nursery-pleated-crib-skirt>.*

Johnson, Liz; "How to Make a Box Pleat or Inverted Box Pleat". May 15, 2012. <http://www.sew4home.com/tips-resources/sewing-tips-tricks/how-make-box-pleat-or-inverted-box-pleat>.*

Sarah; "Our 2012 Christmas Tree and a No Sew Felt & Burlap Tree Skirt". Dec. 22, 2012. <http://www.thethriftress.com/2012/12/our-2012-christmas-tree-and-no-sew-felt.html>.*

* cited by examiner

DECORATIVE COVER FOR OUTDOOR PATIO HEATERS

I want to claim priority of provisional application number: 61/433,270

The product is a decorative cover for outdoor patio heaters. It follows the shape of the heater like a slipcover. It covers the neck down to the base, and the base is a skirt that has welt trim and three box-pleats. The front pleat is self lined fabric, the left and right side pleats are mesh fabric. This allows for ventilation.

The back of the cover has hook/loop fastening inside, from the neck to the base, with three strips of h/l inside the skirt. Label sewn inside panel.

Specifications of components using fire retardant materials:

fabric—100% polyester IFR welt cord—100% polyester FR mesh fabric—100% polyester IFR hook/loop fastening FR

FIG. 1: Front

1 Neck is self fabric 9½" w/47"l to base

2 Base top 5½" w/16" dia.

3 Piping ¾"

4 Base skirt box pleat

5 Base skirt right side—13" w box—pleat with mesh

6 Base skirt left side—13" w box—pleat with mesh

Figure 1:
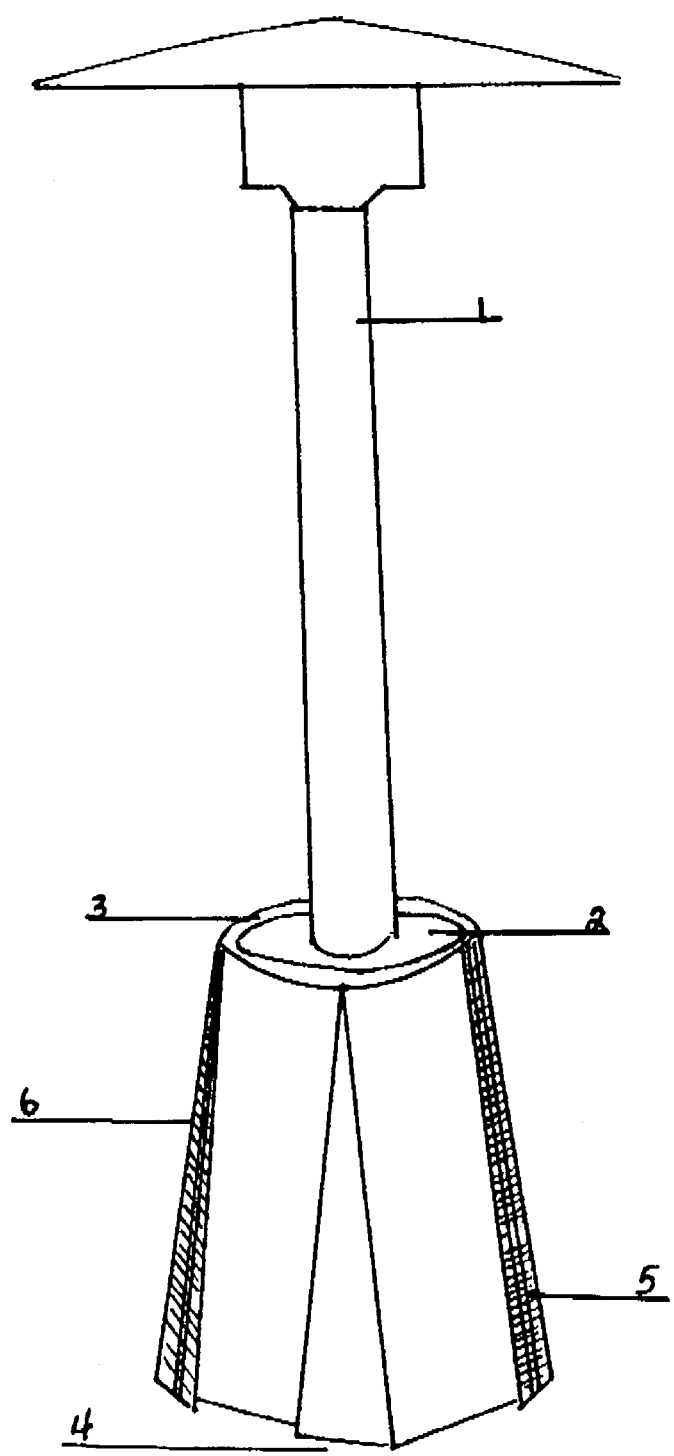
Figure 2:
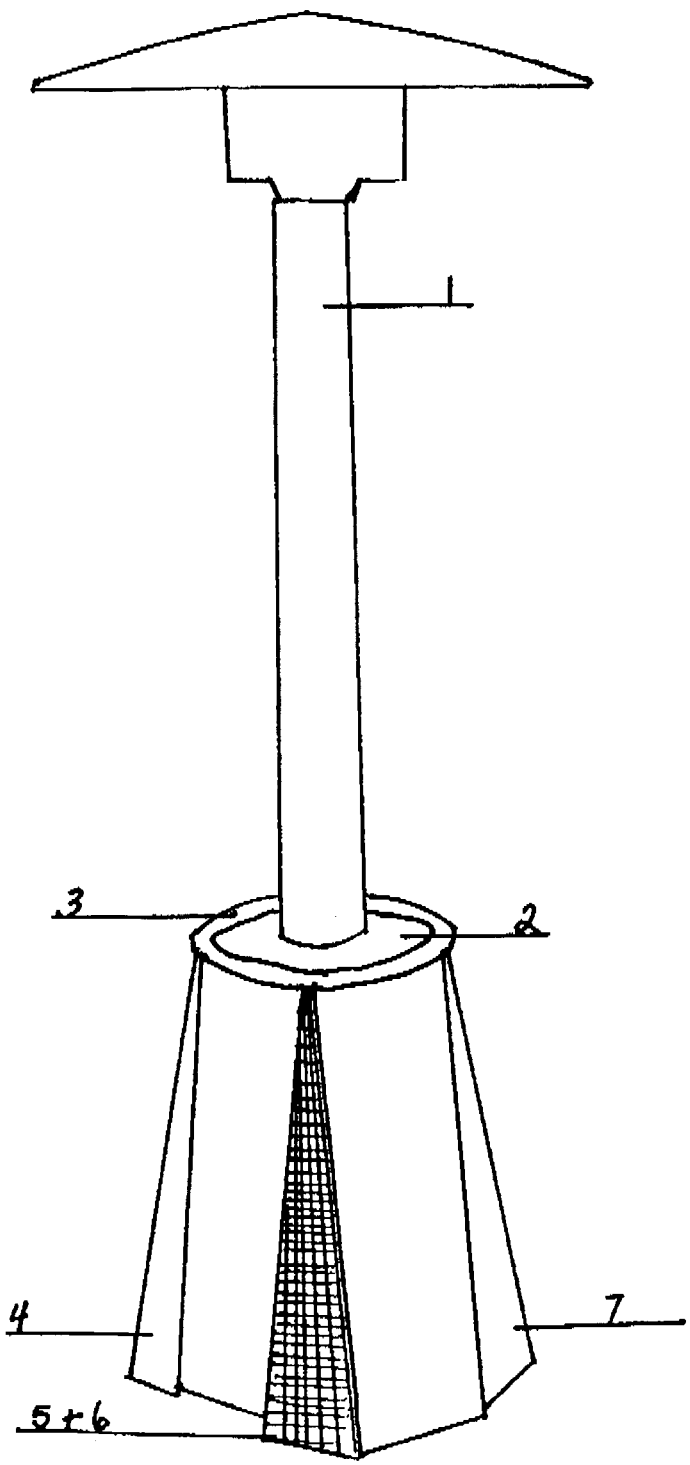
Figure 3:
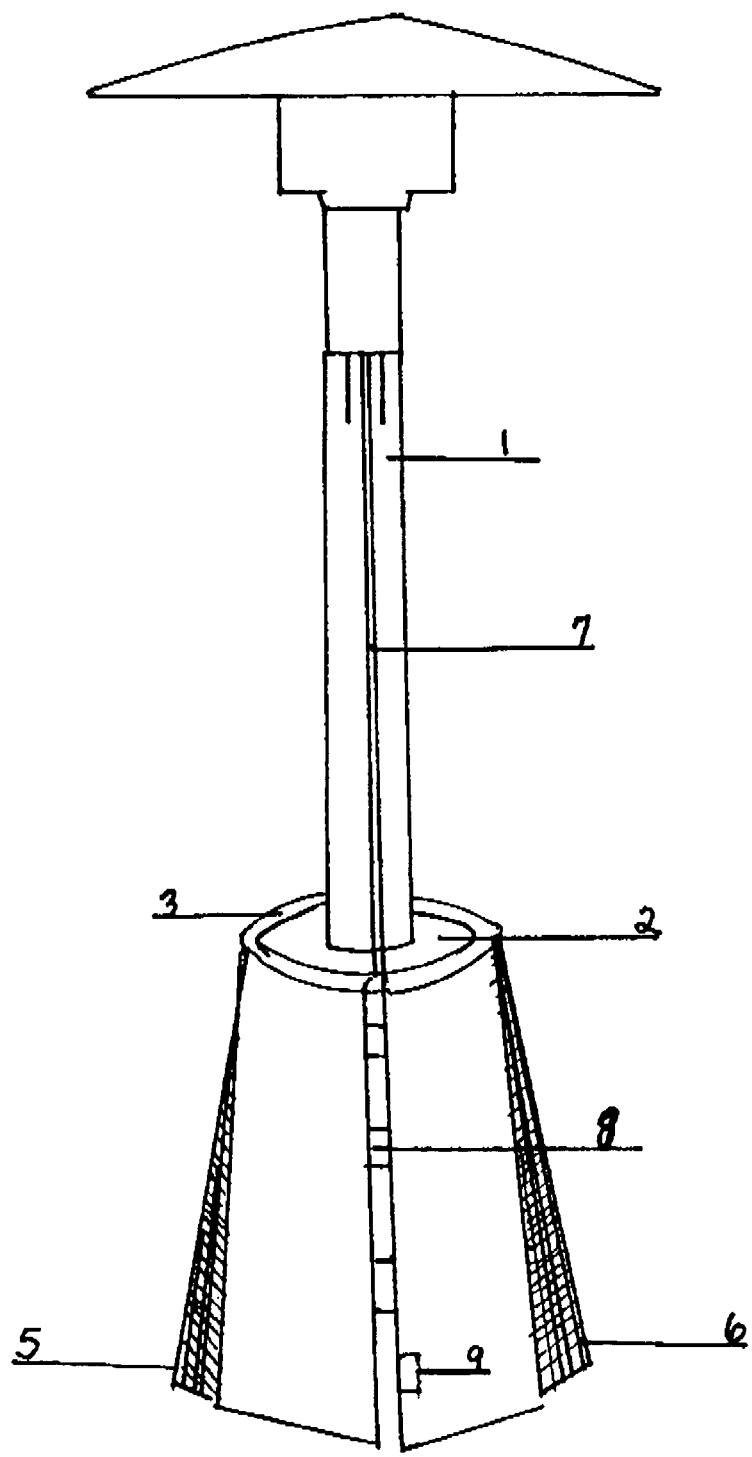

FIG. 2: Left and Right

5 Base skirt 13"w box-pleat with mesh

6 Base skirt 13"w box-pleat with mesh

FIG. 3: Back

1 Neck w/2-3" darts

7 Neck Body—1" hook/loop fastening from top to base 47"—sewn inside

8 3-1½" hook/loop strips inside

9 label sewn inside

Overall height: 78" (controls to bottom of base)

Neck: 9½" width/47" height (controls to base)

Base diameter: 5½" wide from cord to neck/16" total diameter

Base Height: 28" (top of base to bottom)

The invention claimed is:

1. A cover for an outdoor patio heater comprising:
a skirt comprising 100% polyester, the skirt for fitting around a base of the outdoor patio heater, the skirt comprising a three box pleat with two pleats inset with mesh fabric, the mesh fabric comprising 100% polyester, the two pleats disposed on opposing sides of the skirt for providing ventilation;
a welt cord disposed at a top of the skirt, the welt cord comprising 100% polyester;
a neck panel comprising 100% polyester, the neck panel for covering a neck portion of the outdoor patio heater;
an opening extending between a top of the neck panel to a bottom of the skirt through the welt cord; and
hook and loop fasteners disposed on opposing sides of the opening on the neck panel and the skirt at intervals running from the top of the neck panel to the bottom of the skirt;
wherein the cover retains flame resistant qualities and shape after machine wash.

\* \* \* \* \*